United States Patent [19]

Sikdar

[11] 4,256,716

[45] Mar. 17, 1981

[54] PROCESS FOR TREATING LOADED EXTRACTANT FROM PURIFICATION OF PHOSPHORIC ACID BY EXTRACTION

[75] Inventor: Subhas K. Sikdar, San Juan Capistrano, Calif.

[73] Assignee: Occidental Research Corporation, Irvine, Calif.

[21] Appl. No.: 16,651

[22] Filed: Mar. 1, 1979

[51] Int. Cl.³ .............................................. C01B 25/16
[52] U.S. Cl. ............................. 423/321 S; 423/321 R
[58] Field of Search ................... 423/319, 320, 321 R, 423/321 S

[56] References Cited

U.S. PATENT DOCUMENTS

| | | | |
|---|---|---|---|
| 3,694,153 | 9/1972 | Williams et al. | 423/321 S |
| 4,053,564 | 10/1977 | Bradford et al. | 423/321 S |
| 4,082,836 | 4/1978 | Ore | 423/321 S |

*Primary Examiner*—O. R. Vertiz
*Assistant Examiner*—Gregory A. Heller
*Attorney, Agent, or Firm*—Barry A. Bisson; William N. Patrick

[57] ABSTRACT

In a process for purifying an aqueous phosphoric acid containing up to about 55% $P_2O_5$ by weight and dissolved magnesium, iron and aluminum ions, wherein (a) said phosphoric acid is contacted with an organic extractant containing a water immiscible organic sulfonic acid to form: an organic extractant phase containing the organic sulfonic acid, extracted ionic metallic impurities and extracted $P_2O_5$ values, and a purified aqueous phosphoric acid; and (b) the purified aqueous phosphoric acid phase is separated from the organic extractant phase; the improvement comprising (i) contacting said separated organic extractant phase with a solution phase containing calcium ions (e.g., calcium nitrate), under conditions whereby at least some of said extracted ionic metallic impurities (e.g., $Mg^{+2}$, $Al^{+3}$, $Fe^{+3}$) are replaced by calcium and are transferred to said solutions phase; and (ii) separating said solution phase from the contacted extractant phase. The separated extractant phase can be acidified to convert at least some of the metal form of the extractant to the hydrogen or acid form. The separated solution phase from step (ii) can be neutralized to cause a solid precipitate to form, comprising at least some of the metallic impurities and/or $P_2O_5$ values from phosphoric acid which was entrained in the organic extractant.

6 Claims, 3 Drawing Figures

PROCESS FOR TREATING LOADED EXTRACTANT FROM PURIFICATION OF PHOSPHORIC ACID BY EXTRACTION

CROSS REFERENCE TO RELATED APPLICATIONS AND PATENTS

This application is related to the processes for purification of phosphoric acid by extraction of U.S. Pat. No. 3,694,153 to Williams and Stern, U.S. Pat. No. 4,053,564 to Bradford and Ore, U.S. Pat. No. 4,082,836 to Ore and pending U.S. applications Ser. No. 840,791 filed Oct. 11, 1977 of Bradford and Ore titled "Uranium Recovery from Pre-Treated Phosphoric Acid" and Ser. No. 676,559 filed Apr. 13, 1976 of Ore titled "Process for the Production of High Purity Phosphoric Acid from Phosphate Rock and Pebble". The entire disclosure of all of these patents and applications is hereby incorporated herein by reference.

BACKGROUND OF THE INVENTION

Superphosphoric acid (SPA) is a condensation product of orthophosphoric acid. The minimum $P_2O_5$ content of SPA is about 65% by weight, the maximum is greater than 100%. The $P_2O_5$ content of most commercial grades of SPA is from 72% to about 85%.

Wet process phosphoric acid can be converted to SPA by means of conventional evaporation and dehydration techniques. SPA formed from unpurified wet process phosphoric acid is usually unstable due to ionic metallic impurities present therein. The impurities cause an increase in the viscosity of the SPA to such an extent that a semi-solid or glass-like material results. Further processing of such materials is extremely difficult.

On the other hand, purified wet process phosphoric acid yields a low viscosity SPA which can be readily handled (e.g. see U.S. Pat. Nos. 3,044,851 and 3,192,013). Williams et al, U.S. Pat. No. 3,694,153 and U.S. Pat. No. 4,053,564 of Bradford et al, removed ionic metallic impurities from phosphoric acid employing water immiscible orgaic sulfonic acids. Using solvent extraction techniques, wet process phosphoric acid was purified by removing the ionic metallic impurities therefrom.

While removing the impurities, $P_2O_5$ values are entrained or coextracted with the metallic impurities into the organic phase. These $P_2O_5$ values are usually lost when the water immiscible organic sulfonic acid is regenerated with a mineral acid because the mineral acid regeneration solution containing the ionic metallic impurities and the $P_2O_5$ values is sent to waste disposal.

U.S. Pat. No. 4,082,836 of Ore recovers $P_2O_5$ values in the organic extract by contacting the organic extractant with a wash phase comprising water or dilute phosphoric acid to form a loaded wash phase enriched with $P_2O_5$ values extracted from the organic extractant. The loaded wash phase is then separated from the organic extractant phase. The washed organic extractant can then be regenerated on treatment with a mineral acid and be recycled into the process. In the Ore' process (and in those of U.S. Pat. No. 3,694,153 and 4,053,564) the sulfuric acid consumption to regenerate the organic extractant is about 10 times stoichiometric for removal of metal ions. Also, the waste acid must be neutralized (as with lime) before disposal. In the process of the present invention, sulfuric acid and lime concentration is much less than that half that in these prior art processes.

Aqueous phosphoric acid phase denotes a solution of phosphoric acid containing from about 1% to about 55% $P_2O_5$ by weight which will be, is being, or has been subjected to solvent extraction. Terms such as phosphoric acid phase, crude phosphoric acid feed, unpurified phosphoric acid solution and purified phosphoric acid can be used to indicate an aqueous phosphoric acid phase.

Organic extractant phase denotes a solution in which at least one organic sulfonic acid is dissolved in an organic solvent and preferably containing a water immiscible organic phosphate or phosphonate and can also contain a water immiscible aliphatic alcohol. Extractant phase, organic phase, barren organic phase, loaded organic extractant phase, and regenerated organic extractant phase have been used to denote the organic extractant phase at some step in the solvent extraction process.

Wash phase denotes the aqueous phase (water or a dilute solution of phosphoric acid containing from about 10 grams/liter to about 300 grams/liter of $P_2O_5$) which is used to remove $P_2O_5$ values from the organic extractant phase; said $P_2O_5$ values being coextracted with metal impurities into the organic extractant phase during the extracting step of solvent extraction process. Terms used in denote the wash phase are dilute aqueous phosphoric acid, dilute phosphoric acid, dilute phosphoric acid phase, dilute phosphoric acid stripping phase, water wash phase, loaded wash phase, water wash liquor enriched phosphoric acid solution and enriched phorphoric acid phase.

The mineral acid stripping phase is the solution of an inorganic acid such as sulfuric acid, nitric acid or hydrochloric acid which is used to regenerate the organic sulfonic acid present in the organic extractant phase. Sulfuric acid stripping solution, sulfuric acid stripping phase, fresh sulfuric acid stripping solution, stripping agent, sulfuric acid phase, waste sulfuric acid stripping, waste sulfuric acid stripping solution, waste solution and waste stripping agent are used to denote the mineral acid stripping phase.

A mineral acid is an inorganic acid havig an ionization constant equal to $10^{-3}$ or greater.

SUMMARY OF THE INVENTION

The present invention is directed to a process for purifying phosphoric acid using solvent extraction techniques. An unpurified aqueous phosphoric acid phase typically containing from 1% to 55% $P_2O_5$ by weight and dissolved ionic metallic impurities such as calcium, magnesium, iron (II & III) and aluminum is throughly mixed with an organic extractant phase containing at least one organic sulfonic acid in the $H^+$ form. As a result of the thorough mixing, an organic extractant phase containing at least one organic sulfonic acid, extracted ionic metallic impurities and extracted $P_2O_5$ values is formed and separated from the purified aqueous phosphoric acid phase.

If phosphoric acid product is desired, the organic extractant phase is contacted with a wash phase (water or dilute phosphoric acid, preferably containing from about 10 grams/liter to about 300 grams/liter of $P_2O_5$) to form a loaded wash phase enriched with $P_2O_5$ values extracted from the organic extractant phase. The loaded wash phase is separated from the organic extractant phase. The organic extractant phase containing extracted ionic metallic impurities, either washed or unwashed, is contacted with a solution of a calcium salt (e.g. calcium chloride, calcium nitrate), whereby ionic metallic impurities, comprising ions of magnesium and of aluminum, are removed from the extracted phase and replaced therein by calcium ions, followed by contact with a base (e.g. lime) to cause precipitation of a solid phase containing compounds of magnesium and aluminum and $P_2O_5$ values.

If desired, the compounds with $P_2O_5$ values can be separately precipitated below about pH10 from the compounds of magnesium (at above about pH10). These precipitates have a low fluoride content and are useful as an animal feed supplement or as a fertilizer.

The organic extractant phase can be regenerated on treatment with a mineral acid and recycled into the process.

This invention also can provide a solution to an existing effluent problem (e.g., waste acid from regeneration) in the solvent extraction of wet process phosphoric acid and also can provide a means of producing an animal feed supplement.

In the process of Ore', U.S. Pat. No. 4,082,836, where $P_2O_5$ is recovered in a wash step, as much as 5% of the $P_2O_5$ in the impure acid feed can be lost in the waste sulfuric acid. In the present process, this $P_2O_5$ can be recovered as phosphates (of calcium and perhaps aluminum).

In a preferred embodiment, the magnesium in loaded extractant (which can be washed) is removed from the organic phase by a contact with aqueous calcium nitrate solution. Magnesium attached to the active sulfonic acid (DNSA) in the extractant is replaced by calcium ion. Magnesium ion is transferred to the aqueous phase. Thus a magnesium-loaded extractant after substitution becomes predominantly loaded with calcium ion. This is represented by the following reaction:

(1)

The following additional reaction also takes place simultaneously:

(2)

The organic phase (now containing $Ca^2$) is then stripped with a solution of sulfuric acid, whereby the extractant is regenerated and calcium sulfate (gypsum) precipitates in the aqueous phase. Gypsum is filtered and the sulfuric acid recycled.

The aqueous stream now containing nitric acid, magnesium nitrate, and excess calcium nitrate is treated with lime (e.g. PH of 10.5) whereby magnesium is precipitated out. The clear liquor from this operation is recycled to the substitution stage. Aluminum removed from the extractant also precipitates at this step.

In the embodiment described above, there is no liquid waste stream.

THE DRAWINGS

The accompanying drawing.

DETAILED DESCRIPTION

The present process is directed to the purification of phosphoric acid by means of solvent extraction. The process is comprised of an extraction step, a calcium solution (e.g., calcium nitrate contact) step, a neutralization (e.g., lime contact) step and a mineral acid stripping step.

When the solution contains calcium chloride or calcium nitrate, the preferred concentration is in a range of about 1% to saturated at the contact temperature, typically 5 to 15% by weight.

Where more than one calcium solution contact stage is used in a cocurrent operation, the later stages are preferably a lower calcium concentration than the earlier stages. This is because the loaded organic is usually far from fully exchanged with metals and high calcium concentration in multiple stages can cause excess calcium substitution in the organic phase (for hydrogen rather than metals).

Where it is desired to produce additional, highly purified phosphoric acid, a wash phase stripping step can be used prior to the contact of the extractant with the calcium solution.

The extraction step comprises mixing an aqueous phosphoric acid phase with an organic extractant phase. The aqueous phosphoric acid phase, typically containing from 1% to 55% $P_2O_5$ by weight and ionic metallic impurities such as $Ca^{+2}$, $Mg^{+2}$, $Al^{+3}$, and $Fe^{+2,+3}$, is thoroughly mixed with an organic extractant phase (also referred to as the barren organic phase) which contains at least one water immiscible organic sulfonic acid in its $H^+$ form. Ionic metallic impurities are extracted from the aqueous phosphoric acid phase into the organic extractant phase. After mixing, the purified aqueous phosphoric acid phase separates from the organic extractant phase, which now contains ionic metallic impurities and some $P_2O_5$ values extracted from the aqueous phosphoric acid phase. Separation, preferably occurs in a mixer-settler cell, due to density differences and the immiscibility of the two phases. After separation, removal is effected by pumping, decanting, gravity flow or the like.

The separated organic extractant phase containing the ionic metallic impurities and $P_2O_5$ values is mixed with aqueous calcium nitrate, whereby ionic metallic impurities comprising ions of magnesium and aluminum in the extractant phase are replaced by calcium. The aqueous calcium nitrate effluent extractant phase is then treated with a base, preferably lime, to cause precipitation of solids (containing compounds of magnesium and aluminum and $P_2O_5$ values). These solids can be used per se as an animal feed supplement, but more preferably are blended with additional nutrients, such as compounds containing calcium and/or phosphorous (e.g., low fluorine content dicalcium phosphate or "defluorinated" phosphate rock.

Where a lower $P_2O_5$ content solid is desired, or where it is desired to produce additional phosphoric acid prior to contact with the calcium nitrate, the extractant containing metallic impurities is contacted with a wash phase, which can be water or, more preferably, a dilute phosphoric acid phase containing from about 10 grams/liter to about 300 grams/liter of $P_2O_5$. The wash phase extracts the $P_2O_5$ values over the ionic metallic impurities from the organic extractant phase. The wash phase enriched with $P_2O_5$ values extracted from the organic extractant phase is separated from the organic extractant phase. Separation occurs due to density differences and the mutual immiscibility of the phases in a mixer-settler cell.

The separated wash phase can be used as a source of purified phosphoric acid, or it can be mixed with the aqueous phosphoric acid phase which is the feed for the extraction step or it can be diluted with water to form the wash phase, that is the dilute phosphoric acid phase, used to recover $P_2O_5$ values from the organic extractant phase.

The organic extractant phase after separation from the soluble calcium contact stage can be treated with a mineral acid stripping phase preferably containing sulfuric, nitric or hydrochloric acid, to regenerate the sulfonic acid extractant to its $H^+$ form.

The most preferred mineral acid is sulfuric acid, because the calcium in the extractant, which is replaced by hydrogen from the acid, combines with the sulfate ions to form solid calcium sulfate (gypsum) which is easily separated by filtration. This permits the acid phase to be strengthened by adding concentrated acid and be recycled in a closed loop system.

When nitric acid is used for the stripping, the separated "used" acid containing calcium nitrate can be recycled or can be contacted with lime or limestone to produce calcium nitrate for use in removing magnesium, etc. from loaded extractant. If the nitric acid is recycled, a sidestream can be taken off and converted to calcium nitrate and fresh, concentrated acid added to maintain calcium exchange capability.

Similarly, if hydrochloric acid is used and recycled, a sidestream can be contacted with lime or limestone and the resulting calcium chloride solution can be used in removing magnesium, etc. from loaded extractant. Separation of the organic extractant phase from the mineral acid stripping phase in a mixer-settler cell results from differences in density and mutual immiscibility of the two phases. Separation is effected by pumping, decanting, gravity flow or the like. Thereafter the regenerated organic extractant phase can be recycled into the extraction step described above.

The process is preferably run at a temperature of from about 50° to about 65° C. to reduce $P_2O_5$ loss to the organic extractant phase and to increase the speed of separation of the organic phases from the aqueous phases.

The aqueous phosphoric acid phase can be wet process phosphoric acid produced by the dihydrate, the hemihydrate or the anhydrite process; it may be a dilute (1.0% to 5% $P_2O_5$ by weight) solution produced by the acidulation of $P_2O_5$ values in slimes produced in the benefication of phosphate rock, or it may be a waste stream or phosphoric acid whch can contain, in addition to the impurities mentioned, also nickel, copper, zinc, chromium and the like. The impure phosphoric acid which is treated will usually contain from about 26% to about 58% $P_2O_5$ by weight and can be produced by the wet process or by a reduction process, such as those of U.S. Pat. Nos. 1,422,699, 3,052,523; 3,056,659; 3,235,330; 3,241,917; and 3,479,138.

The temperature of the aqueous phosphoric acid phase entering the solvent extraction system is from about 20° C. to about 77° C., preferably from 55° C. to about 70° C.

The organic extractant phase consists of one or more water immiscible organic sulfonic acids. Preferably the water immiscible organic sulfonic acids are dissolved in a water immiscible organic solvent.

Water immiscible organic sulfonic acids employed in accordance with the practice of this invention includes aryl-, alkylaryl-, polyalkylaryl-, alkanoylaryl-, and polyalkanoylaryl-sulfonic acids.

The water immiscible organic sulfonic acids contain at least 12 carbon atoms and preferably about 14 to about 30. An especially preferred group of water immiscible organic sulfonic acids for the present process include dinonylnaphthalene sulfonic acid, 5-dodecanoyl-2-chlorobenzenesulfonic acid, 5-nonyl-2-ethoxybenzenesulfonic acid, 3,5-di-ti-octyl-2(alphacarboxymethoxy)-benzenesulfonic acid and 3,5-di-t-octyl-2-hydroxybenzenesulfonic acid.

The water immiscible organic sulfonic acid can be dissolved in the water immiscible organic solvent in concentrations of about 0.05 molar to about 3.0 molar of the water immiscible organic sulfonic acid. The preferred concentration range of the sulfonic acid in the organic solvent is from about 0.2 molar to about 0.5 molar.

The preferred solvents are saturated hydrocarbons having a boiling point between 120° C. and 230° C., flash points between 15° C. and 70° C. and densities lower than the density of the phosphoric acid.

Illustrative, but nowise limiting, of the water immiscible organic solvents for the organic sulfonic acids employed in the present process are kerosene, mineral spirits, benzene, alkylsubstituted aromatic compounds and alkyl-substituted haloaromatic compounds, such as xylene, toluene, ethylbenzene, chlorotoluene and the like, nitrobenzene, carbon tetrachloride, chloroform, methylene chloride, trichloroethylene, isooctane, heptane and the like. As is well known, materials such as kerosene and mineral spirits are mixtures of compounds.

When using solvent extraction techniques to effect transfer of solutes from one phase to another phase, there can be a problem with emulsion formation. This problem can be minimized by employing water immiscible aliphatic alcohols, water immiscible acid phosphates or phosphonates and mixtures thereof.

Water immiscible aliphatic alcohols can be added to the organic phase and in addition to aiding in the separation of the organic phase from the aqueous phase, they tend to increase the solubility of the water immiscible organic sulfonic acid in the organic phase. Water immiscible aliphatic alcohols are preferred, straight chain or branched chain aliphatic alcohols being especially preferred. Water immiscible aliphatic alcohols which can be employed in the present process are octanol, decanol and isodecanol. Isodecanol is especially preferred.

For the present process, it has been found that the water immiscible aliphatic alcohol can be used in concentrations from 5% to about 20% by weight, based on the weight of the organic extractant phase. A concentration of 7% to about 12% by weight, based on the organic extractant phase, is preferred.

More preferred than a water immiscible alcohol is at least one water immiscible organic acid phosphate, phosphonate or half ester or mixtures thereof with a water insoluble alcohol. These organic acid phosphates are described, for example, in U.S. Pat. No. 4,053,465 and include mixtures of mono-and di-organo substituted phosphoric acid compounds. Typically such a mixture can contain in the range of about 0.1 to about 60.0% mono-substituted and about 97% to about 35% by weight disubstituted organic phosphates. The organic phosphates include the following (mono or di substituted) phosphates: amyl acid phosphate, isooctyl acid phosphate, 2-ethylhexyl acid phosphate, decyl acid phosphate, lauryl acid phosphate, stearyl acid phosphate, phenyl acid phosphate and octylphenyl acid phosphate, cyclohexyl acid phosphate, cyclohexyl phenyl acid phosphate, 1-(5-hexynyl) acid phosphate, 1-(5-hexenyl)-phenyl acid phosphate, 1(6-chlorohexyl) acid phosphate, 1-(6-hydroxyhexyl) acid phosphate and 1-(6-methoxy-hexyl) acid phosphate. When aryl-, alkylaryl or alicyclicaryl-acid phosphates are employed, the aromatic ring can be substituted with a hydroxy, an alkoxy or a halo group.

Water immiscible organic phosphonates can also be used in this invention. The half-ester can be used. The formula for the phosphonates is R–P(O) (OH) (OR°) in which R and/or R° can be alkyl, alkenyl, alicyclic, aryl, alkenylaryl, alkylaryl, alicyclicaryl or heterocyclic. The organic substituent groups, R and R°, may be substituted with an alkoxy, a hydroxy or a halo group; said R groups may be the same or different. R and/or R° should contain from 4 to about 18 carbon atoms.

The water immiscible organic sulfonic acid and the water immiscible organic acid phosphate can be dissolved in water immiscible organic solvents. The preferred solvents are saturated hydrocarbons having a boiling point between 120° and 230° C., flash points between 15° and 80° C. and densities lower than the density of the phosphoric acid. Either pure hydrocarbons or mixtures of hydrocarbons may be used.

Illustrative, but nowise limiting, of the water immiscible organic solvent for the water immiscible organic sulfonic acids and the water immiscible organic acid phosphates employed in the present process are kerosene, mineral spirits, benzene, naphtha, xylene, toluene, nitrobenzene, carbon tetrachloride, chloroform, methylene chloride, trichloroethylene, isooctane, heptane and the like.

The water immiscible organic sulfonic acid can be dissolved in the water immiscible organic solvent in concentrations of about 0.05 to about 3.0 molar or more of the water immiscible organic sulfonic acid. The preferred concentration range of the water immiscible organic sulfonic acid in the water immiscible organic solvent is from about 0.2 to about 0.5 molar.

The water immiscible organic acid phosphate can be dissolved in the water immiscible organic solvent in concentrations of 0.05 to about 1.0 molar or more of the water immiscible organic acid phosphate. The preferred concentration is about 0.15 to about 0.65 molar of the water immiscible organic acid phosphate.

The organic extractant phase enters the solvent extraction system at a temperature of about 20° C. to about 60° C., preferably from about 50° C. to about 58° C.

The phosphoric acid phase at a temperature of from 20° C. to 77° C. is mixed with the organic extractant phase at a temperature of about 20° to about 60° C.; the temperature of the resulting mixture is from about 20° to about 65° C.

The volume ratio of the organic extractant phase to the aqueous phosphoric acid phase in the present process is from about 1 to 1 to about 15 to 1, preferably from about 2 to 1 to about 12 to 1. An especially preferred volume ratio is from about 2 to 1 to about 8 to 1 of the organic extractant phase to the aqueous phosphoric acid phase.

The organic extractant phase is virogously mixed with the aqueous phosphoric acid phase at least once during the purification process. However, the organic extractant phase can be contacted with the aqueous phase a number of times during the process. The number of separate contacts can be from 1 to about to 20 or more; preferably at least 3 contacts are utilized in the present invention.

The organic extractant phase contacts the aqueous phosphoric acid phase and is separated therefrom. Separation in a mixer-settler cell results from difference in densities and the mutual immiscibility of the phases.

The organic extractant phase extracts $P_2O_5$ values as well as ionic metallic impurities from the aqueous phosphoric acid phase. The $P_2O_5$ values can range from 3% to about 20% of the $P_2O_5$ initially present in the aqueous phosphoric acid phase. Recovery of these $P_2O_5$ values from the organic extractant phase is desirable. The present invention permits recovery of these $P_2O_5$ values as a solid e.g., comprising, calcium phosphates or, with a wash step, as a solid and a phosphoric acid solution.

Where a wash phase is used, the organic extractant phase, containing the ionic metallic impurities and $P_2O_5$ values extracted from the aqueous phosphoric acid phase, is virogously mixed with the wash phase. Jet mixers, line mixers, centrifugal pumps, mechanical agitators and the like can be used to effect the mixing. Separation in a mixer-settler cell results from differences in densities and the mutual immiscibility of the two phases. Separation is effected by pumping, decanting, gravity flow or the like. Separation of the two phases gives an organic extractant phase and a loaded wash phase. The loaded wash phase has removed $P_2O_5$ values from the organic phase. The temperature maintained in the wash phase is from about 20° C. to about 70° C., preferably from about 55° C. to about 65° C.

The volume ratios of the organic extractant phase to the calcium solution (e.g. calcium nitrate) phases can be from 1 to 1 to about 10 to 1, preferably from about 2 to 1 to about 4 to 1.

After thorough mixing of the calcium nitrate phase with the organic extractant phase at a temperature of from about 20° to about 65° C., the wash phase and the organic extractant phase are separated. Separation preferably occurs in a mixer-settler cell due to the differences in density and the immiscibility of the phases. The phases are separated by pumping, decanting, gravity flow or the like.

The organic extractant phase separated from the loaded calcium nitrate phase can be regenerated by treatment with a mineral acid phase. Ionic metallic impurities and residual $P_2O_5$ values are removed from the organic extractant phase by means of a mineral acid stripping treatment and the water immiscible organic sulfonic acid is regenerated to its $H^+$ form.

The mixing of the mineral acid stripping phase and the organic extractant phase is achieved with a jet mixer, line mixer, centrifugal mixer, a mechanical agitator or the like. The temperature of the mixture is from about 20° to about 65° C. Separation of the two phases occurs in a mixer-settler cell due to immiscibility of the two phases and a difference in specific gravities. The phases are further separated by pumping, decanting, gravity flow or the like.

The volume ratio of the organic extractant phase to the mineral acid stripping phase can be in the range from about 0.5 to 1 to about 15 or more to 1, preferably 1 to 1 to about 5 to 1. At a ratio less than 1:1, an aqueous continuous phase can form at low acid strengths. The organic extractant phase is contacted with the mineral acid stripping phase at least once, preferably from 1 to about 10 times and most preferably only once.

The mineral acid used in stripping the organic extractant phase can be sulfuric, nitric, or hydrochloric acid; sulfuric acid being greatly preferred because insoluble calcium sulphate can be readily separated from the liquid (acid and organic extractant). The concentration of the hydrochloric acid and the nitric acid can be from about 2% acid to about 60% (or more) acid by weight. The concentration of the sulfuric acid in the mineral acid stripping phase can be from about 2% to about 50.0% $H_2SO_4$ by weight (the upper limit being determined by excess viscosity), preferably from 15% to 30% $H_2SO_4$ by weight. The mineral acid stripping phase is maintained at about 20° C. to about 77° C., preferably from 60° C. to 71° C. The temperature of the mineral acid stripping phase is achieved by utilizing the heat of dilution of the mineral acid with water and by using hot steam condensate as the diluent for the mineral acid.

The hot mineral acid stripping phase (illustrated hereinafter by sulfuric acid) removes the calcium ions and any other residual extracted ionic metallic impurities and residual $P_2O_5$ values from the organic extractant phase. The mineral acid stripping phase after separation (as described) from the regenerated organic extractant phase contains principally calcium sulfate solids and unused sulfuric acid. It can also contain small amounts of phosphoric acid and the sulfate salts of other ionic metallic impurities. When the initial concentration of the sulfuric acid in the mineral acid stripping phase is from 10% to 30% $H_2SO_4$ by weight, considerable amounts of sulfuric acid are present in the waste mineral acid stripping phase which can be utilized by mixing it with fresh mineral acid stripping phase. Alternately, all or a portion of waste mineral acid stripping phase can be sent to waste disposal where the sulfuric acid in the mineral acid stripping phase is reacted with lime or the like to form gypsum. Preferably at least a stoichiometric amount of sulfuric acid is used to regenerate the organic sulfonic acid in the organic extractant phase. The regenerated organic extractant phase, having the water immiscible organic sulfonic acid contained therein converted back to its H+ form, is transported to the organic extractant phase storage area (barren organic phase) for use in the above extraction process.

U.S. Pat. No. 4,082,836 illustrates a mixer-settler typical of those used in the present process. The mixer-settler is a rectangular container, the length being greater than the width or depth. The top portion is open, although during operation it can be covered to reduce solvent loss, decrease fire hazard and reduce the introduction of contamination therein. The mixer-settler is divided into several sections. A mixing chamber containing a agitator and an organic extractant phase inlet and an aqueous phosphoric acid phase inlet are located at one end of the mixer-settler. The inlets are located in the bottom portion of the mixing chamber in order to achieve good contact between the organic and aqueous phases. The organic extractant phase—aqueous phase mixture passes over a weir when mixing chamber is filled into a settling chamber. Here the phases separate into an organic extractant phase and an aqueous phosphoric acid phase. At times, a small emulsion band, several inches thick can occur at the interface. This can be reduced by prior contact of the phosphoric acid with activated carbon, or the other means suggested in Ser. No. 840,791. Recovery chambers are separated by a wall. When the settling chamber becomes filled, the organic extractant phase passes over a weir into an organic extractant phase recovery chamber. At the same time, the aqueous phase passes through an adjustable standpipe which controls the position of the interface into the aqueous phase recovery chamber. Once in the recovery chamber, the organic extractant phase passes through an outlet and is sent either storage or to another mixer-settler cell for further treatment. Aqueous phosphoric acid phase passes through outlet and is sent to storage as purified phosphoric acid or to another mixer-settler cell.

In a continuous process, several mixer-settler cells can be arranged in series with the organic extractant phase moving through the cells in series counter-currently to the movement of the aqueous phosphoric acid phase through the cells.

Figure 1:
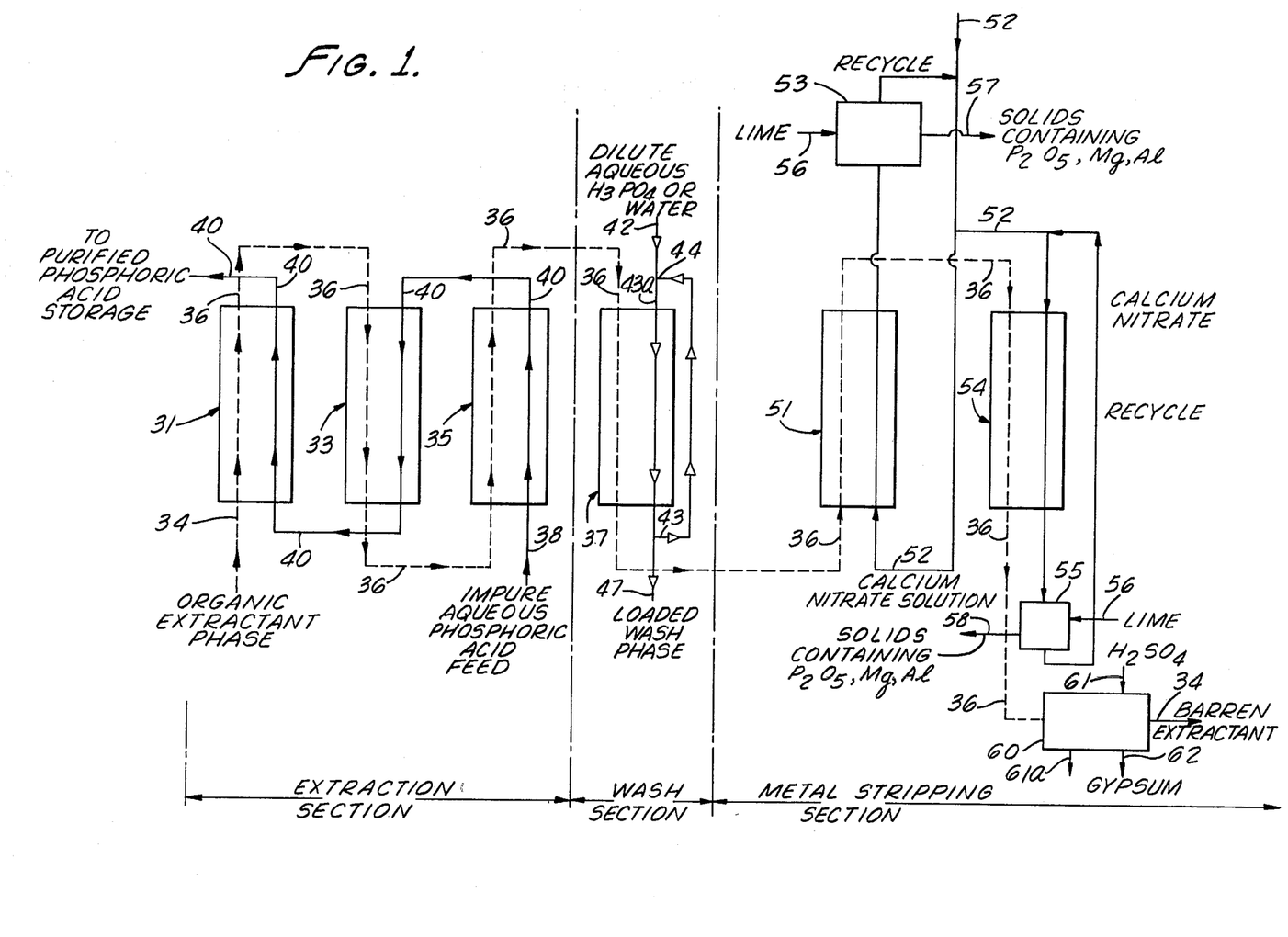
FIG. 1 is a schematic of the present solvent extraction process.
Figure 2:
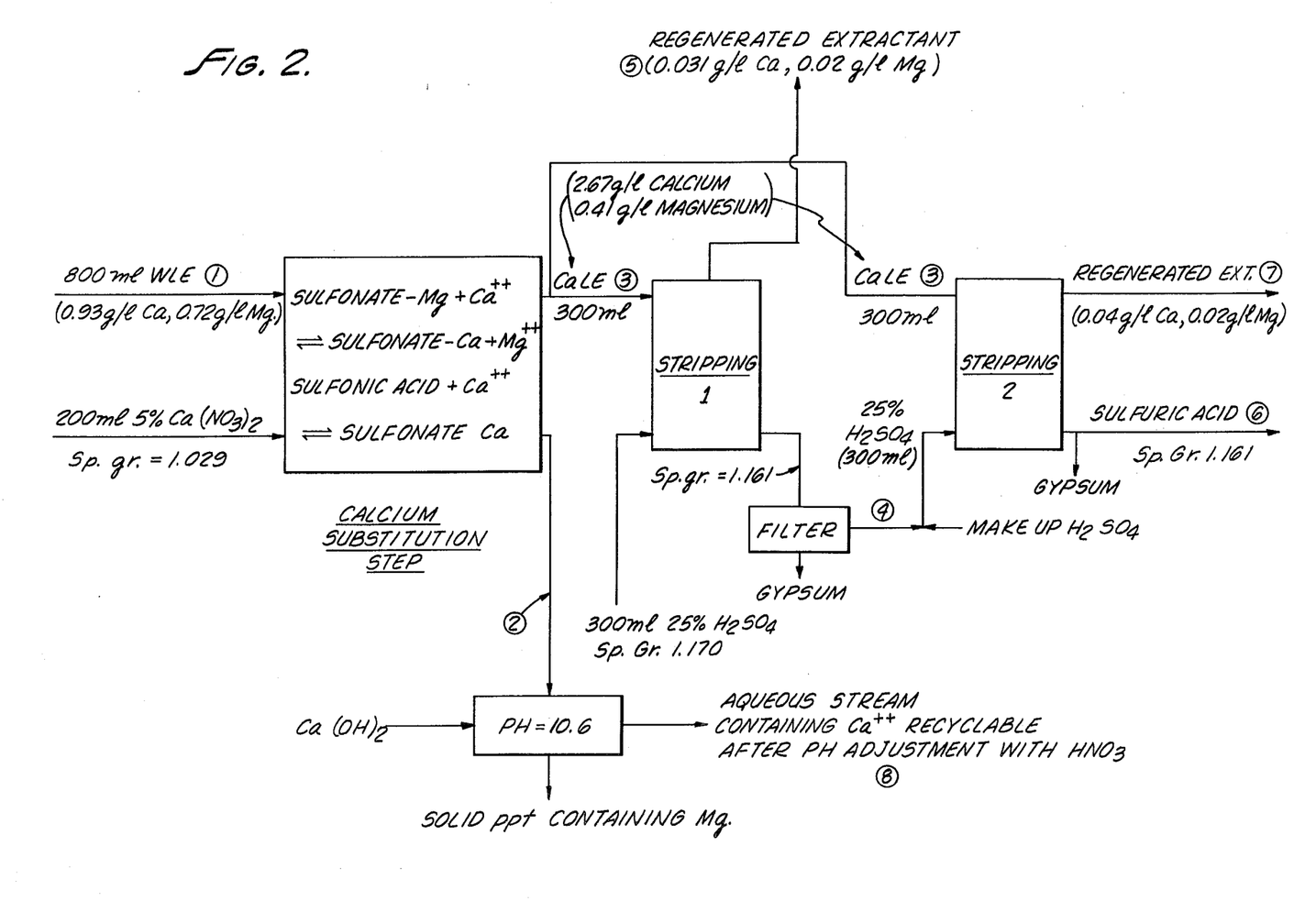
FIG. 2 is a schematic description of the process of Example 1.

The FIG. 1 is a schematic of one preferred embodyment of the process for the purification of phosphoric acid.

Aqueous phosphoric acid phase 38 prepared by the dihydrate, the hemihydrate or the anhydride process enters mixer-settler cell 35. The incoming aqueous phosphoric acid phase 38, at a temperature of about 20° C. to about 77° C., is mixed with an organic extractant phase 36, at a temperature of about 20° to about 60° C., which contains considerable quantities of ionic metallic impurities and $P_2O_5$ values as the result of having passed through mixer-settler cells 31 and 33. The temperature of the mixture is about 50° to about 65° C. The organic extractant phase 36 and the aqueous phosphoric acid phase 38 so mixed passes into the settling chamber (not shown) of mixer-settler cell 35 in which the two phases separate. The aqueous phosphoric acid phase 40 passes into mixer-settler cell 33, where the mixing, settling and separation steps described above are repeated. The organic extractant phase 36 contacting the aqueous phosphoric acid phase 40 in mixer-settler cell 33 contains less extracted ionic metallic impurities than the organic extractant phase entering cell 35 because it has contacted the aqueous phosphoric acid phase in only one cell.

On exiting cell 33, the aqueous phosphoric acid phase 40 is sent to mixer-settler cell 31, and is mixed with organic extractant phase 34 entering cell 31. The organic extractant phase 34 enters the extraction section at a temperature of about 20° C. to about 60° C., preferably from about 50° C. to about 58° C. The temperature of the resulting mixture is about 50° C. to about 65° C.

The mixing, settling and separation process is repeated in cell 31. The aqueous phosphoric acid phase 40 exiting cell 31 is purified to such an extent that it is suitable for SPA production and passes to purified phosphoric acid storage (not shown).

The organic extractant phase 36 extracts ionic metallic impurities from aqueous phosphoric acid phase 40 in cells 31, 33, and 35; in addition, $P_2O_5$ values are coextracted into the organic extractant phae 36. The organic extractant phase 36 containing ionic metallic impurities and $P_2O_5$ values, after leaving the extraction section, enters mixer-settler cell 37 of the wash section.

If it is desired to maximize the yield of phosphoric acid rather than producing low fluoride solids (suitable as an animal nutrient), wash phase 42 can be mixed with phosphoric acid at T-junction 44. The resulting dilute phosphoric was phase 43a passes into cell 37. The organic extractant phase 36 is vigorously mixed with the wash phase 43a in cell 37. $P_2O_5$ values are extracted from the organic extractant phase 36 into the wash phase 43a. After settling, the organic and aqueous phases are separated. The loaded wash phase is divided into streams 43 and 47. The loaded wash phase is diluted with incoming water 42, at T-junction 44 and recycled back into cell 37. The stream 47 is mixed with aqueous phosphoric acid phase 38 (not shown) and re-enters mixer-settler cell 35.

The organic extractant phase 36, exiting cell 37, contains ionic metallic impurities and residual $P_2O_5$ values and is treated in mixer-settler cells 51 and 54 with a calcium solution phase (e.g., aqueous calcium nitrate) 52. Cells 51 and 54 can be similar in structure to the cell illustrated in U.S. Pat. No. 4,082,836.

The metal stripping section preferably comprises a treatment with calcium solution, a neutralization step and a mineral acid stripping phase. In the metal stripping section, in contrast to the other sections, the flow of the organic and aqueous phases is cocurrent. The organic extractant phase 36 from the wash section is contacted with a soluble calcium phase 52 comprised, for example, of from about 2% to about 30% by weight calcium nitrate with the remainder being water. The temperature of the calcium solution phase 52 can be from about 20° C. to about 77° C., preferably from about 60° C. to about 71° C. This temperature can be achieved by utilizing the heat of dilution of sulfuric acid with water and with hot steam condensate.

One the FIG. 1, the treatment with soluble calcium and the subsequent neutralizations are shown as one in two stages, in vessels 51, 53 and 54, 55. If no more than about 90% removal of magnesium and aluminum impurities is desired, one section (e.g., 54,155) can be eliminated.

In FIG. 1, the aqueous calcium phase 52 is pumped into mixer-settler cell 51 and mixed with the partially stripped organic extractant phase 36 coming from mixer-settler cell (or 35, if the wash is omitted). The temperature of the resulting mixture is from about 50° C. to about 65° C. After mixing, the mixture of the organic and the aqueous phase is allowed to settle and separate into discrete phases. The immiscibility of the two phases and the difference in the specific gravities of the phases aids separation. After separation, the organic extractant phase 36 is pumped to a second mixer settler cell 54, where it is again contacted with a soluble calcium phase.

Upon leaving the mixer-settler cell 51, the soluble calcium phase is passed through a neutralization stage where it is contacted with a base (e.g., lime) to precipitate solids comprising compounds of calcium, magnesium, aluminum, phosphorous (i.e. "$P_2O_5$" values) and sulfate (because commercial wet-process phosphoric acid usually contains in the range of about 0.5 to about 5% sulfate ions some of which is picked up by the organic extractant).

These solids are low in fluorine and are useful as an animal feed supplement (e.g., for poultry feeding). In the figure the solids are identified as "solids containing $P_2O_5$, Al, Mg".

The neutralized soluble calcium solution ("calcium nitrate solution" in the FIG. 1) is preferably recycled to the mixer-settler 51. Alternatively, (not shown) the neutralized soluble calcium solution could be passed to the second mixer settler cell 54.

Similarly, in the FIG. 1, the organic extractant phase 36 is passed through a second mixer-settler 54 where it is again contacted with a soluble calcium solution 52.

The organic extractant phase 36 from the mixer-settler 54 (or if a single calcium contact, 51) is contacted in vessel 60 with a mineral acid stripping phase 61 comprised of from about 2% to about 30% by weight sulfuric acid, with the remainder being water. The temperature of the mineral acid stripping phase 61 is from about 20° C. to about 77° C., preferably from 60° C. to about 71° C. The temperature is achieved by utilizing the heat of dilution of sulfuric acid with water and with hot steam condensate.

The mineral acid stripping phase 61 is pumped into mixer-settler cell 60 and mixed with the partially stripped organic extractant phase 36 coming from mixer-settler cell 54, the temperature of the resulting mixture is from about 50° C. to about 65° C. After mixing, the mixture of the organic and the aqueous phase is allowed to settle and separate into discrete phases. The immiscibility of the two phases and the difference in the specific gravities of the phases aids separation.

After separation, the barren organic extractant phase 34 is pumped to organic extractant phase storage (not shown). The mineral acid stripping phase 61a on exiting cell 60 is termed the "waste mineral acid stripping phase". The waste mineral acid stripping phase on exiting the mixer-settler cell 60 is reduced in strength to between about 15% to 20% by weight $H_2SO_4$. The waste mineral acid stripping phase can be partially combined with mineral acid stripping phase 61 (not shown) to further utilize unused sulfuric acid values in said waste mineral acid stripping phase, or it can be sent to a neutralization stage (53 or 55) or to a disposal area (notshown) where the sulfuric acid values and impurities can be precipitated by the addition of lime or the like to waste mineral acid stripping phase 61a. The waste mineral acid can be purified by electro-dialysis.

When the organic extractant which is predominantly loaded by calcium ion is regenerated by sulfuric acid, calcium sulfate forms and precipitates in the aqueous phase. The aqueous phase is easily filterable and the sulfuric acid can be recycled. Since the removal of calcium is dictated by the low solubility of gypsum, considerably higher strengths of sulfuric acid can be used than with the prior art processes.

EXAMPLE 1

A stock solution of the organic extractant phase was prepared by dissolving dinonylnaphthalenesulfonic acid (DNSA) and di-(2-etheylhexyl) phosphoric acid (DEHPA) in mineral spirits containing isodecanol. The composition by weight was as follows:

| | |
|---|---|
| DNSA | 18% |
| DEHPA | 6% |
| Mineral Spirits | 74% |
| Isodecanol | 2% |

The organic extractant phase, as described above, was contacted with hemihydrate process phosphoric acid containing 41% by weight $P_2O_5$ at a phase volume ratio of 6/1 (organic/phosphoric acid) at 54° C. After the phases separated, the organic extractant phase was centrifuged to remove and entrained phosphoric acid phase therefrom to produce a metal-loaded organic extractant phase. The loaded extractant was washed with dilute (1% $P_2O_5$) aqueous phosphoric acid to remove $P_2O_5$ values from the loaded extractant phase and produce a washed-metal-loaded extractant (hereinafter, sometimes, "WLE"). The ionic metallic impurity content and the $P_2O_5$ content of the washed organic extractant phase was determined in the following manner. An aliquot of the organic phase was stripped with equal volumes of 2N HCl; the total volume of the HCl used was equal to the volume of the organic extractant phase analyzed. The ionic metallic impurities were analyzed by means of atomic absorption spectrophotometric methods. The $P_2O_5$ (% by weight) was analyzed by the official method of AOAC Method 12, page 13, 11th Edition, 1960*.

The WLE analysis was 0.93 g/l Ca, 0.72 g/l Mg.

1. Substitution step: 800 ml WLE was shaken with 200 ml 5% $Ca(NO_3)_2$ solution for 5 minutes. Twenty minutes' settling was allowed. The aqueous stream was designated as Sample 2. Both WLE and substituted WLE (henceforth called CaLE or calcium loaded extractant) was shaken with equal volume of 2N HCl. The aqueous from these operations constituted Sample 1 and Sample 3, respectively, representing calcium and magnesium ion content in the organic phase.

2. One part of CaLE, 300 ml was shaken with 300 ml 25% $H_2SO_4$ (O/A=1). The aqueous phase after the exchange was filtered for gypsum and the liquor was designated as Sample 4. The sample prepared from the regenerated organic (2N HCl strip) was designated as Sample 5.

3. To test the recyclability of the aqueous stream from strip 1 step, another 300 ml of CaLE was stripped with the aqueous stream from 4, after the strength was brought back to 25% $H_2SO_4$. The sample prepared from the regenerated strip from this step was called Sample 7. The aqueous stream constituted Sample 6.

4. Aqueous stream from substitution step (Sample 2) was limed unti pH rose to 10.6. The precipitate containing magnesium was filtered off.

5. These samples analyzed for calcium, magnesium, iron, aluminum, etc.

The results of the above tests were as follows:

1. Using a 5% $Ca(NO_3)_2$ solution, 43% of magnesium in the WLE was transferred to the aqueous phase. Also 3.45 atoms of calcium formed calcium sulfonate per atom of calcium replacing magnesium in the extractant. A preliminary test previous to this test showed a 92% magnesium removal using a more concentrated calcium chloride solution. Thus a stronger solution of calcium nitrate will be needed to increase magnesium removal at this stage.

Analyses of the streams for calcium, magnesium and aluminum adequately represented material balance as shown in the following diagram.

Total Ca in = 3.26 gm  Total Ca out = 2.9 gm
Total Mg in = 0.58  Total Mg out = 0.58
Total Al in = 0.08  Total Al out = 0.13

2. Waste $Ca(NO_3)_2$ Stream Liming:

Analysis of the limed stream showed that 95.5% of magnesium in the stream was removed by liming. Aluminum and iron were almost quantitatively removed.

3. Stripping with $H_2SO_4$

Both stripping operations produced satisfactory regenerated extractants containing comparable calcium and magnesium (within experimental error). The recyclability of the sulfuric acid strip liquor is established beyond any doubt. The material balance closure was also satisfactory. This is shown in Table 1.

TABLE 1

| Material Balance in Stripping | | |
|---|---|---|
|  | Stripping 1 | Stripping 2 |
| Total calcium in | 0.81 gm | 0.91 gm |
| Total calcium out | 0.11 gm | 0.12 gm |
| Calcium precipitated | 0.69 gm | 0.80 gm |
| Total magnesium in | 0.12 gm | 0.26 gm |
| Total magnesium out | 0.14 gm | 0.21 gm |
| Total aluminum in | 0.03 gm | 0.056 gm |
| Total aluminum out | 0.03 gm | 0.04 gm |
| Concentration of Ca in BE | 0.03 gm/l | 0.04 gm/l |
| Concentration of Mg in BE | 0.02 gm/l | 0.02 gm/l |

EXAMPLE 2

Figure 3:
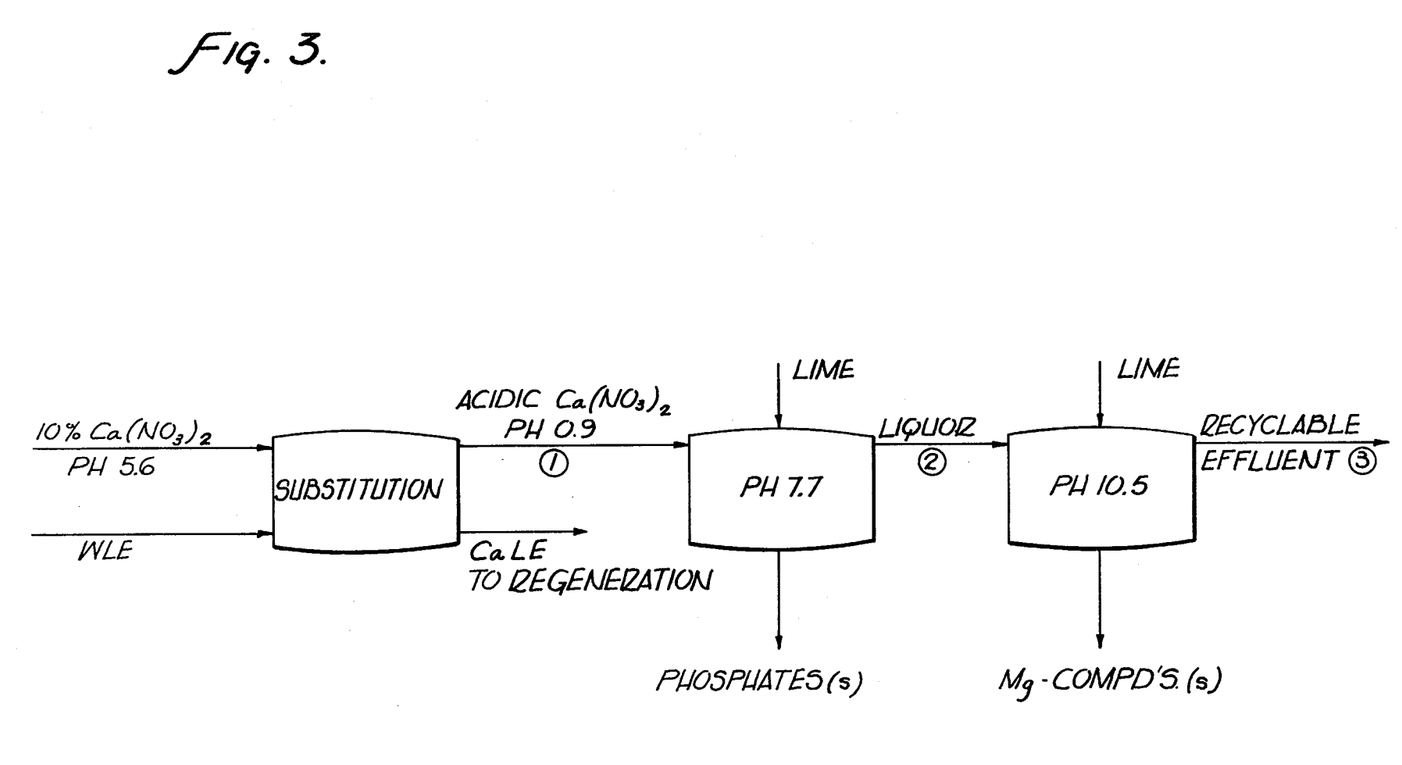
FIG. 3 is a schematic description of the process of Example 2.

70 ml of a 10% $Ca(NO_3)_2$ solution was shaken in a separating funnel with 170 ml of WLE (O/A=2.43) at room temperature for 5 minutes. After phase disengagement the aqueous stream was subjected to sequential pH adjustments with lime. At pH 7.7 phosphates precipitated and the filtrate was further treated with lime to attain a pH of 10.5, when magnesium compounds precipitated. The experimental scheme is shown in FIG. 3 with sample identifications. The analysis for components of these samples are presented in Table 2.

TABLE 2

| | ANALYSIS OF SAMPLES | | | |
|---|---|---|---|---|
| Sample # | Mg.g/l | Ca.g/l | Al./gl | $P_2O_5$ . g/l |
| 1 | 0.84 | 15.9 | 0.20 | 5.65 |
| 2 | 0.51 | 18.6 | 0.00 | 0.01 |
| 3 | 0.01 | 19.2 | 0.00 | 0.01 |

This Example 2 establishes that:

Controlled liming of the calcium nitrate solution from the substitution step of a slightly alkaline pH (e.g. 7.7) removed entrained phosphate quantitatively. This recovery of the phosphate improves the economics. The recovered $P_2O_5$ was entrained in WLE.

A second stage liming to adjust the pH of the supernatent liquid to about 10.5 removed magnesium from solution without precipitating the calcium. Thus, the calcium nitrate stream can be regenerated and recycled.

EXAMPLE 3

A continuous pilot plant run of the process, using calcium nitrate stripping was conducted. This run (Run 1) lasted for six hours. The operating temperature was 95° F. Washed loaded extractant (WLE), similar to that in Example 1, was contacted in two stages with 10% calcium nitrate solution. The calcium loaded extractant was contacted with 25% $H_2SO_4$ in the third contactor.

The three phase ($CaSO_4$ $2H_2O$, organic and aqueous sulfuric acid) slurry was then fed to a thickener. Solid calcium sulfate and sulfuric acid were withdrawn from the bottom of the thickener, while the regenerated organic (barren extractant) was withdrawn from a weir at the top. The gypsum filtration characteristics were excellent. The conditions of the run were as follows:

| | | |
|---|---|---|
| extractant | : | 40 cc/min |
| $Ca(NO_3)_2$, 1st stage | : | 20 cc/min |
| $Ca(NO_3)_2$, 2nd stage | : | 20 cc/min |
| 25% $H_2SO_4$ | : | 20 cc/min |
| O/A ratio | : | 2/1 |
| Residence time in mixers | : | 5 minutes |

Samples were taken from various locations and analyzed for the efficiency of the exchange and regeneration of the extractant. Results are shown in Table 3.

TABLE 3

| | Strip Results of Run 1 | | | | | |
|---|---|---|---|---|---|---|
| Sample | Ca, g/l | Mg, g/l | Al, g/l | Fe$_3$, g/l | NO$_3$, g/l | P$_2$O$_5$, g/l |
| Washed loaded extractant | 0.24 | 0.95 | 0.15 | 0.021 | 0.29 | |
| Barren extractant | 0.17 | 0.013 | <.02 | 0.117 | 0.11 | 0.063 |
| Calcium nitrate effluent from from Stage 1 | 14.1 | 1.375 | 0.205 | 0.045 | 46.5 | 5.3 |
| Calcium nitrate effluent from from Stage 2 | 19.85 | 0.37 | 0.065 | 0.005 | 64.0 | 1.15 |

This run showed a 92% efficiency in calcium magnesium exchange in the calcium nitrate treatment stages. Quality of the barren extractant was good as shown in the table. Two other runs (Run #3 and Run #4) were made in which the regeneration of the calcium nitrate effluent and the sulfuric acid stream was done and the streams recycled.

What is claimed is:

1. In a process for purifying an aqueous phosphoric acid containing $P_2O_5$ values and dissolved ionic impurities comprising magnesium, iron and aluminum ions, wherein (a) said phosphoric acid is contacted with an organic extractant containing a water-immiscible organic sulfonic acid to form: a loaded organic extractant containing the organic sulfonic acid, extracted ionic metallic impurities and extracted $P_2O_5$ values, and a purified aqueous phosphoric acid; (b) the purified aqueous phosphoric acid is separated from the loaded organic extractant to provide a separated organic extractant; and (c) the organic extractant is regenerated from the separated organic extractant for recycle to step (a); the improvement comprising;

(i) contacting said separated organic extractant from step (b) with a solution containing calcium ions obtained from dissolving a member selected from calcium chloride and calcium nitrate, under conditions whereby at least some of said extracted ionic metallic impurities are replaced by calcium and are transferred to said solution; and (ii) separating said solution from the contacted organic extractant.

2. The process of claim 1 wherein the regeneration in step (c) is effected by acidifying said contacted organic extractant from step (ii) comprising the metal form of the organic extractant to convert at least some of the metal form of the organic extractant to the hydrogen or acid form.

3. The process of claim 1 wherein said aqueous phosphoric acid which is purified by said process contains up to 55 weight % $P_2O_5$.

4. The process of claim 1 wherein said separated organic extractant is washed with water or dilute phosphoric acid prior to said contacting of step (i).

5. The process of claim 2 wherein in step (c) said contacted extractant is acidified with nitric acid or hydrochloric acid.

6. The process of claim 1 wherein in step (i) said solution containing calcium ions comprises aqueous calcium nitrate or aqueous calcium chloride.

* * * * *